United States Patent [19]
Robideau

[11] Patent Number: 5,282,053
[45] Date of Patent: Jan. 25, 1994

[54] SCAN IMAGE PROCESSING

[75] Inventor: Robert P. Robideau, Webster, N.Y.

[73] Assignee: Xerox Corporation, Stamford, Conn.

[21] Appl. No.: 782,200

[22] Filed: Oct. 23, 1991

[51] Int. Cl.⁵ .................. H04H 1/00; H04N 5/14
[52] U.S. Cl. .................................. 358/406; 358/461
[58] Field of Search .............. 358/406, 429–430, 358/456–458, 461, 465–466; 250/578

[56] References Cited

U.S. PATENT DOCUMENTS

| | | | |
|---|---|---|---|
| 4,383,275 | 5/1983 | Sasaki et al. | 358/280 |
| 4,520,395 | 5/1985 | Abe | 358/163 |
| 4,602,293 | 7/1986 | Sekine | 358/280 |
| 4,660,082 | 4/1987 | Tomohisa et al. | 358/461 |
| 4,806,780 | 2/1989 | Yamamoto et al. | 358/461 |
| 4,974,098 | 11/1990 | Miyakawa et al. | 358/406 |

Primary Examiner—Stephen Brinich
Attorney, Agent, or Firm—Ronald F. Chapuran

[57] ABSTRACT

The method of scanning a document by providing a test patch to be scanned, initially scanning the test patch and storing the signal response of each reading element to the test patch in a pixel threshold table, providing a document to be scanned, scanning the document and comparing the signal response of each reading element with the corresponding signal response in the pixel threshold table, and printing a mark or not printing a mark in response to the comparison for each reading element. The method includes an extended threshold table to cover halftone cells.

14 Claims, 10 Drawing Sheets

SCAN IMAGE PROCESSING

BACKGROUND OF THE INVENTION

1. Field of the Invention

The invention relates to pictorial and text scanning apparatus, and more particularly to a method of compensating for non-uniformity in sensors in image scanning.

2. Description of the Prior Art

Historically, copies of document originals have been produced by a xerographic process wherein the document original to be copied is placed on a transparent platen, either by hand or automatically through the use of a document handler, and the document original illuminated by a relatively high intensity light. Image rays reflected from the illuminated document original are focused by a suitable optical system into a previously charged photoconductor, the image light rays functioning to discharge the photoconductor in accordance with the image content of the original to produce a latent electrostatic image of the original on the photoconductor. The latent electrostatic image so produced is thereafter developed by a suitable developer material commonly referred to as toner, and the developed image transferred to a sheet of copy paper brought forward by a suitable feeder. The transferred image is thereafter fixed as by fusing to provide a permanent copy while the photoconductor is cleaned of residual developer preparatory to recharging.

More recently, interest has arisen in electronic imaging where in contrast to the above described xerographic system, the image of the document original is converted to electrical signals or pixels and these signals, which may be processed, transmitted over long distances, and/or stored, are used to produce copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals could be used to create an image by some means such as operating a laser beam to discharge a xerographic photoreceptor, or by operating some direct marking system such as an ink jet or thermal transfer printing system.

The prior art related to these types of systems includes:

U.S. Pat. No. 4,602,293 to Sekine discloses an apparatus having a shading correction reference surface which is scanned prior to scanning a manuscript. The output of a photoelectric converter (i.e., an image sensor array) produced while scanning the shading correction reference surface is converted to a digital signal and stored in a memory as a reference. Subsequently, while the manuscript is scanned, the output of each cell of the photoelectric converter is supplied to a comparator along with an analog version of the corresponding reference signal in the memory to effect shading correction of the output.

U.S. Pat. No. 4,383,275 to Sasaki et al. discloses a system for providing read-out level compensation in an optical reader system. In operation, the system first reads a white background to obtain a reference output. The reference output is reversed and stored in a memory. The actual sensor output derived from an original sheet is multiplied by the memorized, reversed reference output to get a compensated video signal.

U.S. Pat. No. 4,520,395 to Abe discloses a system for correcting shading or non-uniformity in a photosensitive element array due to light source, lens, optical transmission, and sensor characteristics. The system employs a memory having a number of cells corresponding to the number of photoelements positioned along a linear photosensitive array. The sensor output of each respective element is successively compared with data value stored in a corresponding memory cell in the memory. With each successive output of the linear array, the data stored in the memory is updated by determining the larger data value signal and then storing that signal in the corresponding memory cell. The stored data for each line is converted with a weighting factor and multiplied by the sensor output to produce a compensated output.

A difficulty with these prior art systems is often the difference in the sensors or reading elements themselves causing non-uniformity in response, as well as the varying effect on each sensor caused by variations in illumination level caused by optics and lamp degradation. In addition, prior art calibration systems are often limited to manuscript or text applications rather than halftone applications. It would be desirable, therefore, to be able to compensate for the above identified non-uniformities and also be able to provide halftone calibration in addition to text calibration.

It is an object of the present invention, therefore, to provide a new and improved scanner calibration system. It is another object of the present invention to provide an image scanner that calibrates itself by scanning a patch whose density defines the threshold level between black and white. It is another object of the present invention to provide a circuit architecture which gives both thresholding and halftone image processing without a central processing unit. Other advantages of the present invention will become apparent as the following description proceeds, and the features characterizing the invention will be pointed out with particularity in the claims annexed to and forming a part of this specification.

SUMMARY OF THE INVENTION

In a scanning system having an array of image reading elements, the method of scanning a document by providing a test patch to be scanned, initially scanning the test patch and storing the signal response of each reading element to the test patch in a pixel threshold table, providing a document to be scanned, scanning the document and comparing the signal response of each reading element with the corresponding signal response in the pixel threshold table, and printing a mark or not printing a mark in response to the comparison for each reading element. The method includes an extended threshold table to cover halftone cells.

BRIEF DESCRIPTION OF THE DRAWINGS

For a better understanding of the present invention, reference may be had to the accompanying drawings wherein the same reference numerals have been applied to like parts and wherein:

FIG. 5A-5D are illustrations of the technique of pictorial calibration in accordance with the present invention;

DESCRIPTION OF THE PREFERRED EMBODIMENT

Figure 1:
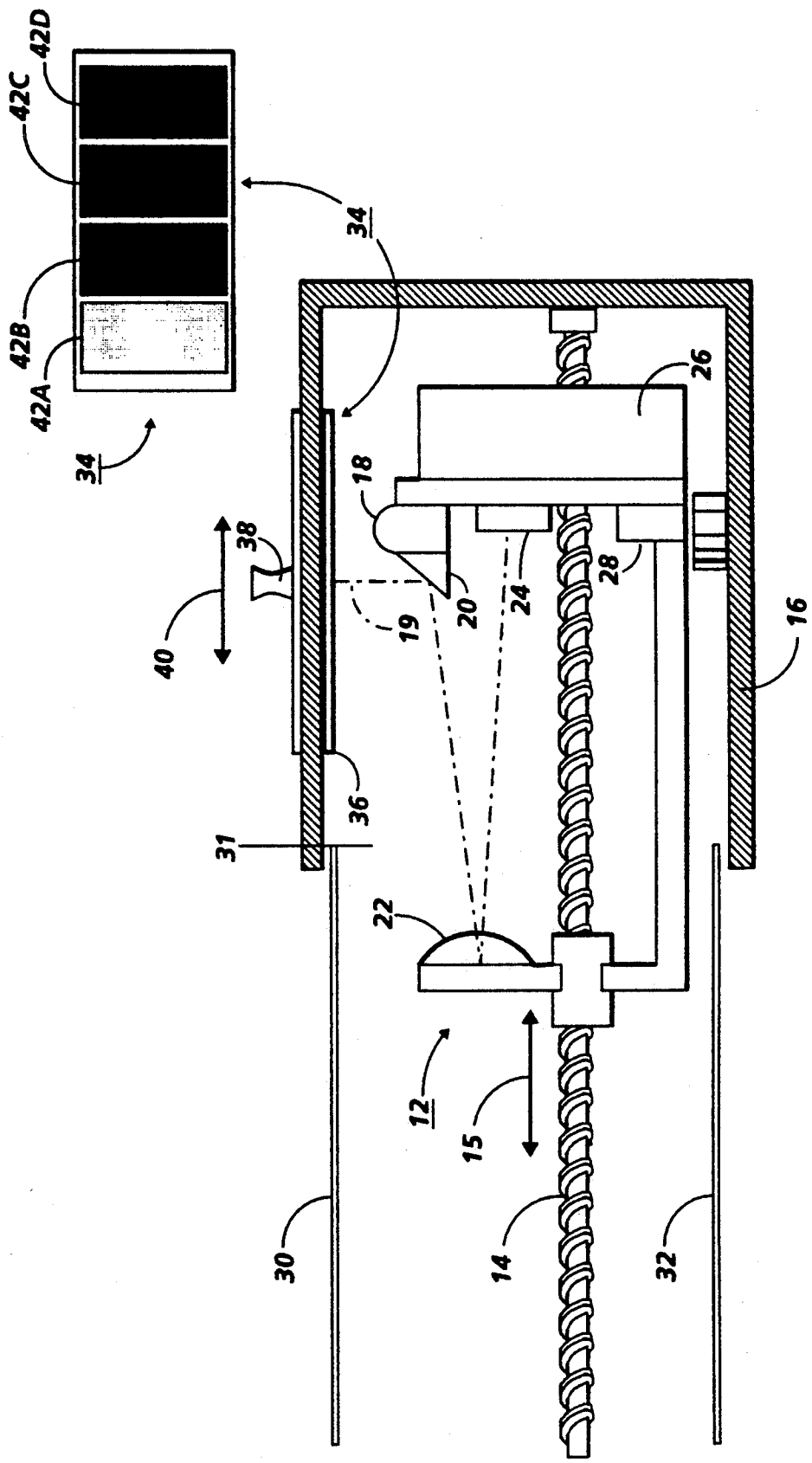
FIG. 1 is a schematic illustration of a machine incorporating a calibration control in accordance with the present invention.

Referring to FIG. 1 of the drawings, there is shown a combined input/output scanner, designated generally by the numeral 10. With reference to FIG. 1, there is illustrated a typical scanner printer that might incorporate the present invention. There is generally shown a carriage assembly at 12 mounted on a lead screw 14 for reciprocal motion as illustrated by the carriage motion arrows 15 in relation to the machine frame 16. An array of light emitting diodes 18 project light upwardly, line 19, to be reflected down to the 45 degree mirror 20, in turn reflecting the light to the lens 22. The light is projected from the lens 22 to an array of image sensors 24. The array of light of image sensors 24 is suitably secured to the sub assembly 26 along with a suitable printing device such as an ink jet head 28. In operation, for scanning a stationery document illustrated at 30, the carriage assembly 12 moves from right to left to a start of scan position to suitably position the LED's 18 and mirror 20 at the right edge 31 of the document 30 to be scanned. As the carriage moves further to the left, the LED's project light to the document 30 and the document reflects the light to the mirror 20 to the lens 22 on to the array of image sensors 24 to sense the degree of reflected light from the document image. Similarly, in printing an object onto the stationery copy paper 32, the carriage 12 is moved to a start of print position and the ink jet print head 28 moves across the copy paper 32 to suitably project black and white dots onto the paper representative of the scanned image.

In accordance with the present invention, a calibration strip illustrated at 34 is suitably mounted on the underside of a contrast control 36 with projecting knob 38 for movement of the calibration strip to the right or left as illustrated by the arrows 40. As illustrated, the carriage assembly is in a home position, immediately underneath the contrast control 36 with calibration strip 34. The calibration strip contains a plurality of patches with predetermined densities. Thus, patch 42A is a very light density, 42B a darker density, 42C an even darker density, and 42D a very dark density. In operation, an operator moves the contrast control 36 to locate the desired density patch 42A-42D directly above the LED array 18 and the mirror 20. Thus, an operator can calibrate or set the threshold level of the machine to a desired density level by shifting the calibration strip 34 in a manner to position the desired density patch immediately above the imaging system. Each individual sensor of the image sensor array 24 will respond to the particular density patch, and this response is recorded in a pixel threshold table 44 as shown in FIG. 2.

Figure 2:
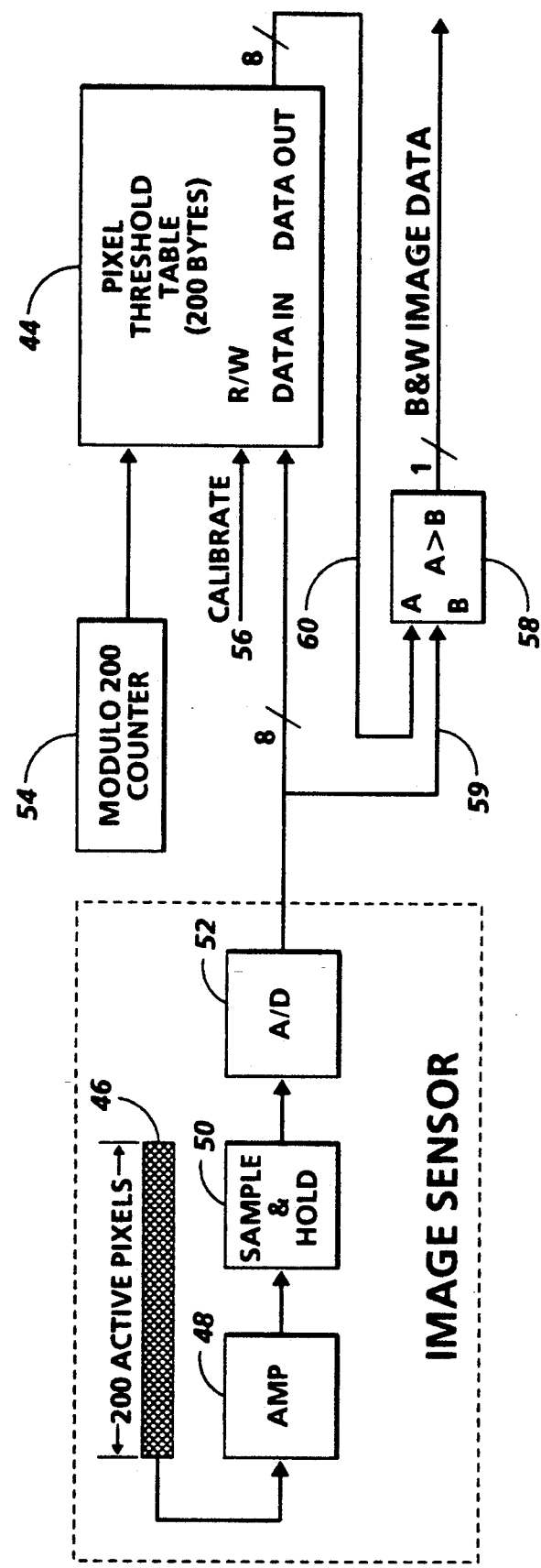
FIG. 2 is a block diagram of text only circuitry in accordance with the present invention.

With reference to FIG. 2, there is illustrated the calibration circuitry in accordance with the present invention. Assuming 200 sensors in the sensor array 23, each of the sensors receives a reflected signal from a particular patch of the calibration strip as illustrated at 46. This signal for each of the sensors is amplified as shown at 48 conveyed to sample and hold circuitry 50 and converted to digital form by the analog to digital circuitry 52 before input to the pixel threshold table 44, each pixel signal response being represented by an 8 bit byte. Modular 200 counter 54 maintains the count of the 200 sensors and the calibrate signal 56 which causes the system to enter the calibration mode.

In the copy mode, as a document is being scanned by the carriage assembly 12 for printing, the response of each sensor of the sensor array 24 is amplified at 48, conveyed to sample and hold circuitry 50 and to the analog to digital converter 52 and then conveyed to the threshold comparator 58 on line 59 where the response of a particular sensor is compared to the calibrated response of that same sensor provided by the pixel threshold table 44 on line 60. If the document signal is darker then the calibration data at that particular sensor, then a drop of ink is printed. If the document signal is lighter, then a drop of ink is not printed. Thus, the calibration patch defines the threshold between black and white in the machine. By designing a calibration strip with several different target patches and allowing the operator to slide the strip back and forth at the reference station, several different threshold settings are provided. This allows the operator to adjust for documents with high back ground levels or for documents printed on non white paper. The contrast or lighter or darker control adjustment can also be used to remove pencil markings from a document or to even enhance markings.

Figure 3:
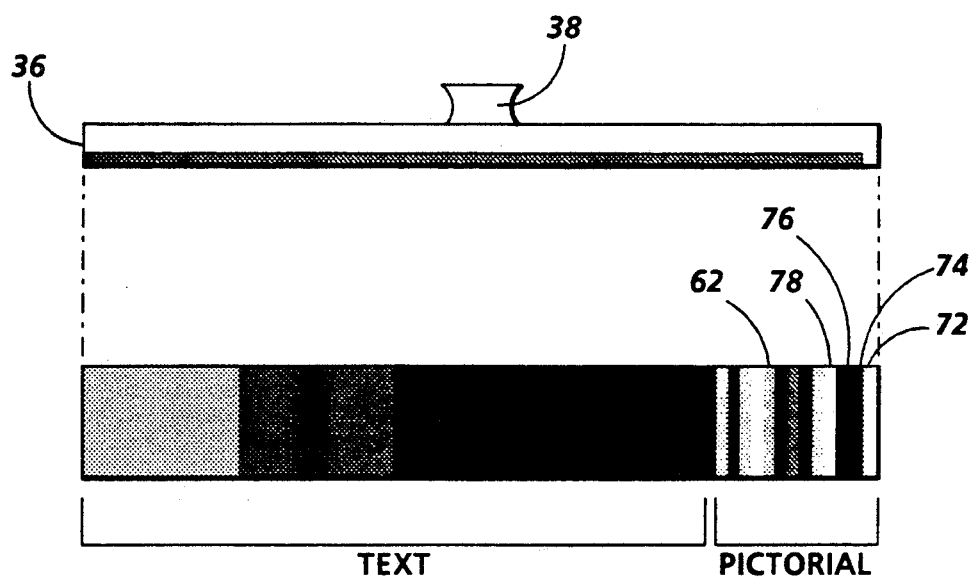
FIG. 3 is a schematic illustration of the calibration patch in the pictorial mode.
Figure 4:
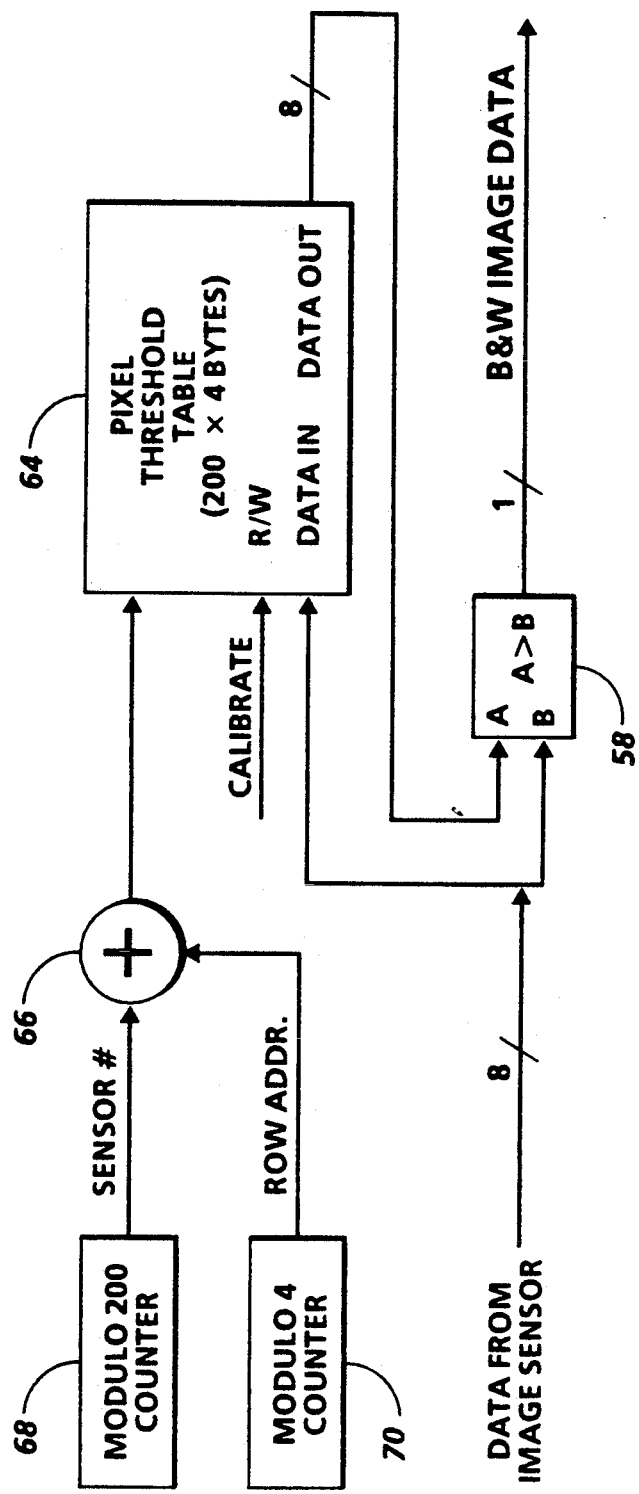
FIG. 4 is a block diagram of text/pictorial circuitry in accordance with the present invention.

In accordance with another feature of the present invention, calibration settings can be provided for the copying or printing of pictorial images rather than text images. A series of gray or pictorial stripes 62 are printed at one end of the calibration strip as illustrated in FIG. 3. The density of each stripe corresponds to the density of one pixel in a half tone cell, for example, for a 4×4 half tone cell, there are 16 strips. FIG. 4 is an illustration of the expansion of the block diagram of FIG. 2 to accommodate the calibration of pictorial images as well as text images. As illustrated at 64 in FIG. 4, the pixel threshold table is extended to 200×4 bytes and the pixel address counter 66 indexes in both x and y directions. The x component of the pixel address is the sensor number from modulo 200 counter 68 and the y component is a row in the half tone cell determined by modulo 4 counter 70.

Figures 5A, 5B:
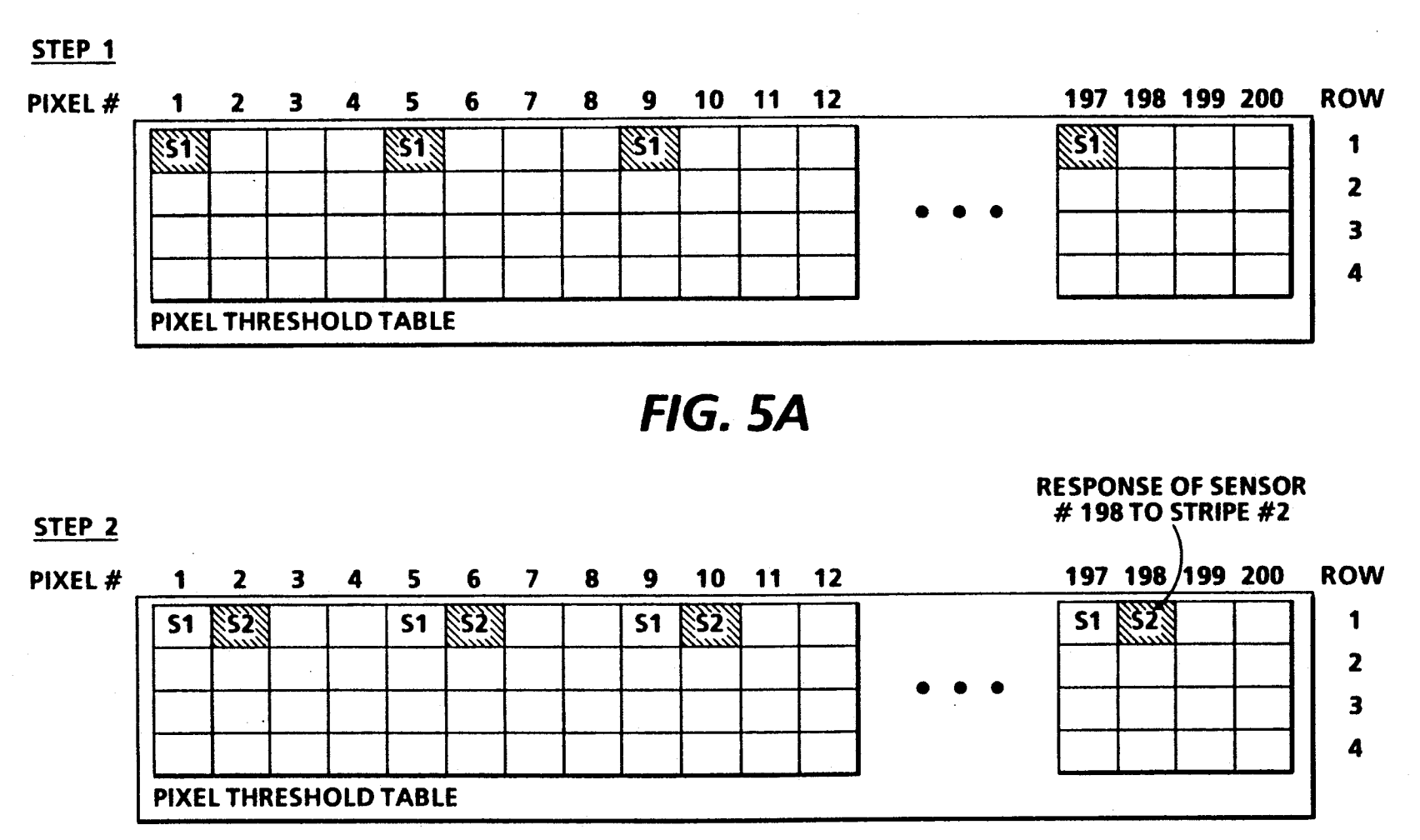
Figures 5C, 5D:
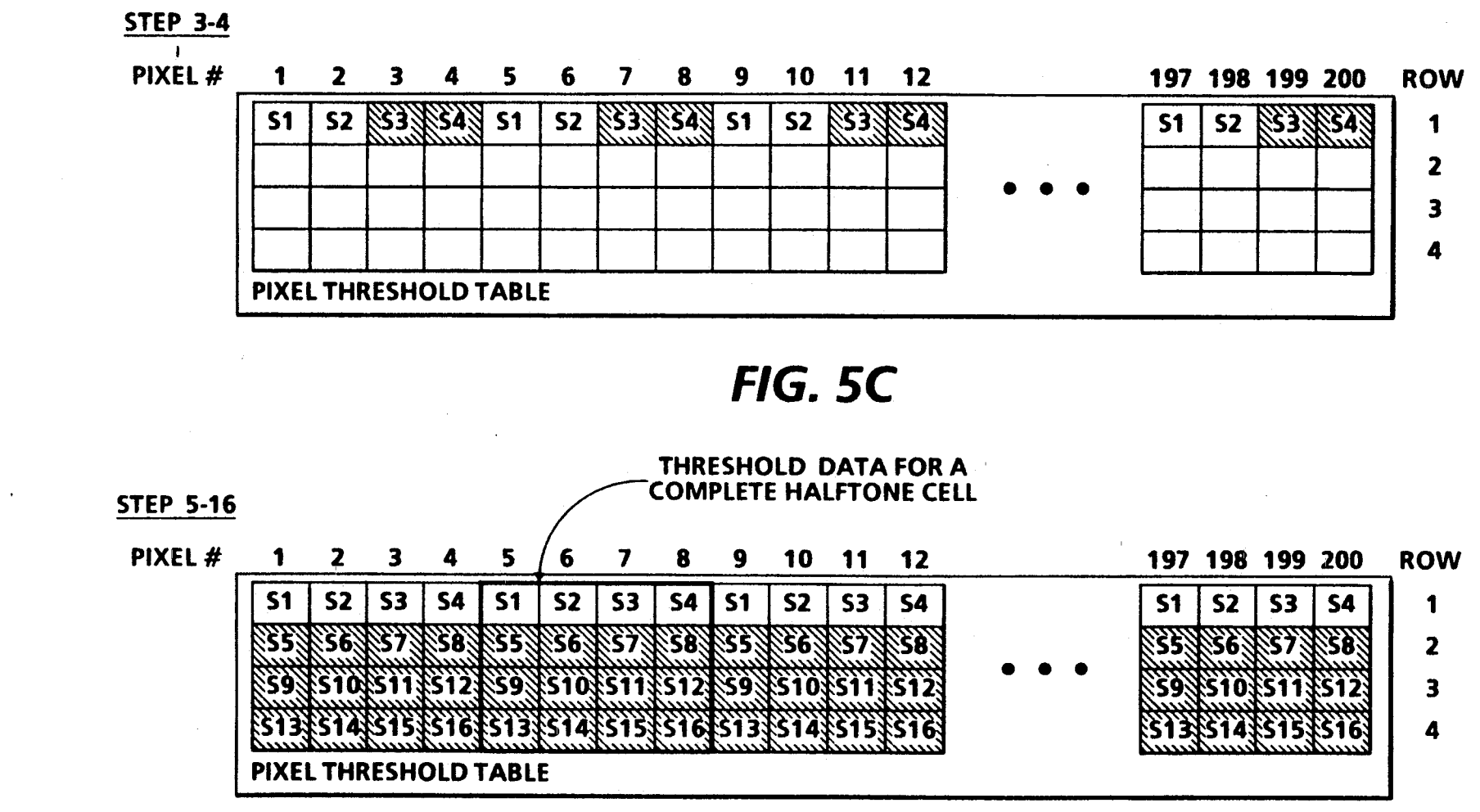

Calibration consists of reading the first strip 72 and recording the response of every fourth sensor element, that is, sensors 1, 5, 9 etc. in the first row of the pixel threshold table as shown in FIG. 5A. Next the carriage indexes to a position under strip 74 and the responses of sensors 2, 6, 10 etc. are recorded as shown in FIG. 5D. The process repeats for strips 76 and 78 at which time the first row of the table is completely filled as shown in FIG. 5C. In a similar manner rows 2 through 4 are filled with data obtained by scanning the remaining strips illustrated in FIG. 5D. The copy mode functions as before except that the pixel address counter 66 increments modulo 4 in the scan direction. Note that the expanded circuit will operate in the text mode if a wide gray patch is positioned over the calibration station. During calibration, the gray patch will be scanned 16 times as above. However, all rows of the pixel threshold table will contain the same data. Thus, in text mode, the threshold level for each pixel is fixed whereas in pictorial mode the threshold level for a pixel is dependent upon its spatial position in a half tone cell.

Figure 6:
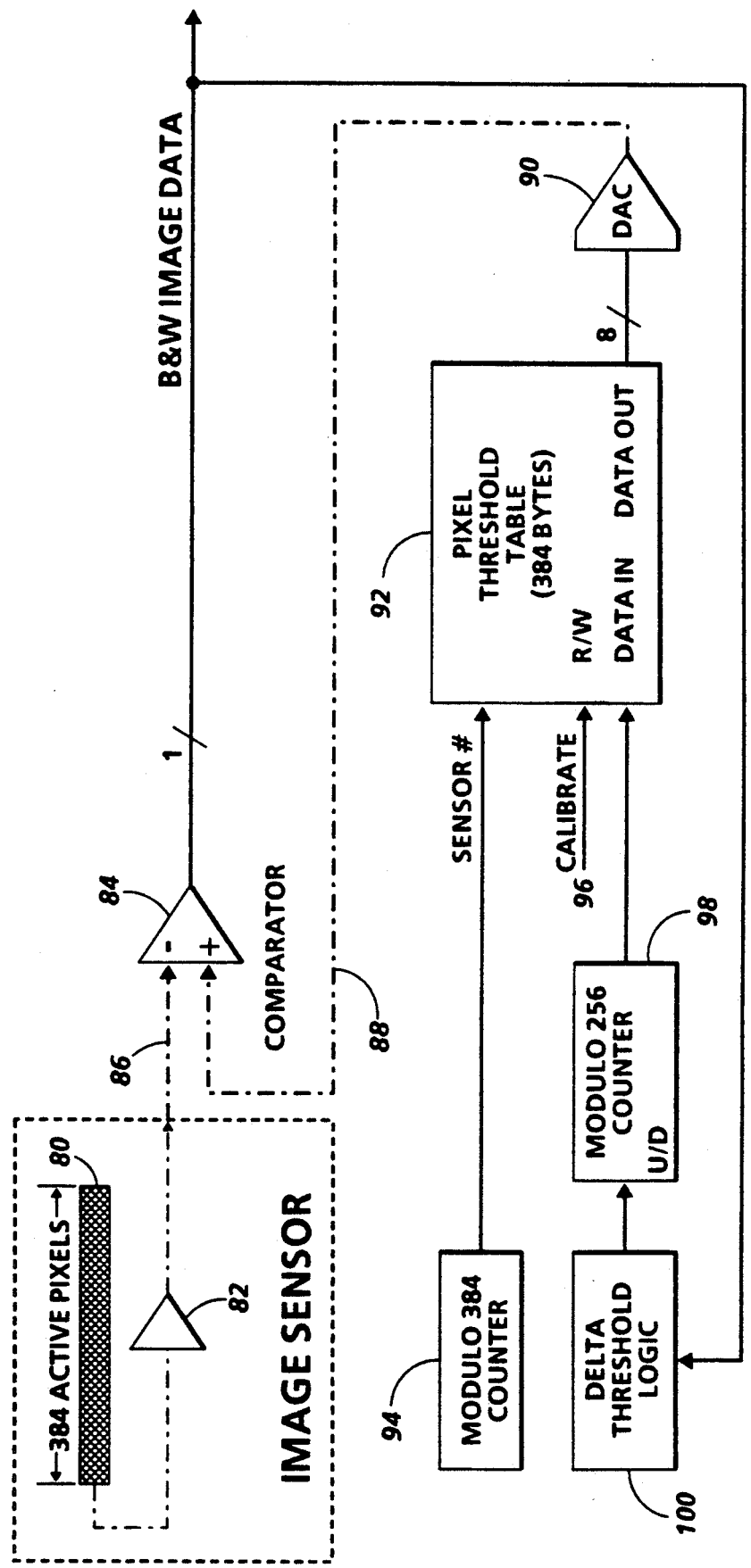
FIGS. 6 and 7 are block diagrams of alternative embodiments of text and pictorial circuitry in accordance with the present invention.

With reference to FIG. 6, there is an alternate embodiment of the text only calibration circuitry. In this particular embodiment, there are 384 sensor elements 80 receiving calibration signals from the predetermined calibration strip. The output of each of these sensors is amplified as shown at 82 and conveyed to an analog comparator 84, along line 86. The second input to the comparator 84, is from line 88, the output of the digital to analog converter 90. The input to the digital analog converter 90 is from the pixel threshold table 92, the output of the pixel threshold table 92 being a digital representation of a density level. The input to the threshold table 92 is the identification of the particular sensor being calibrated provided by modular 384 counter 94.

Figure 7:
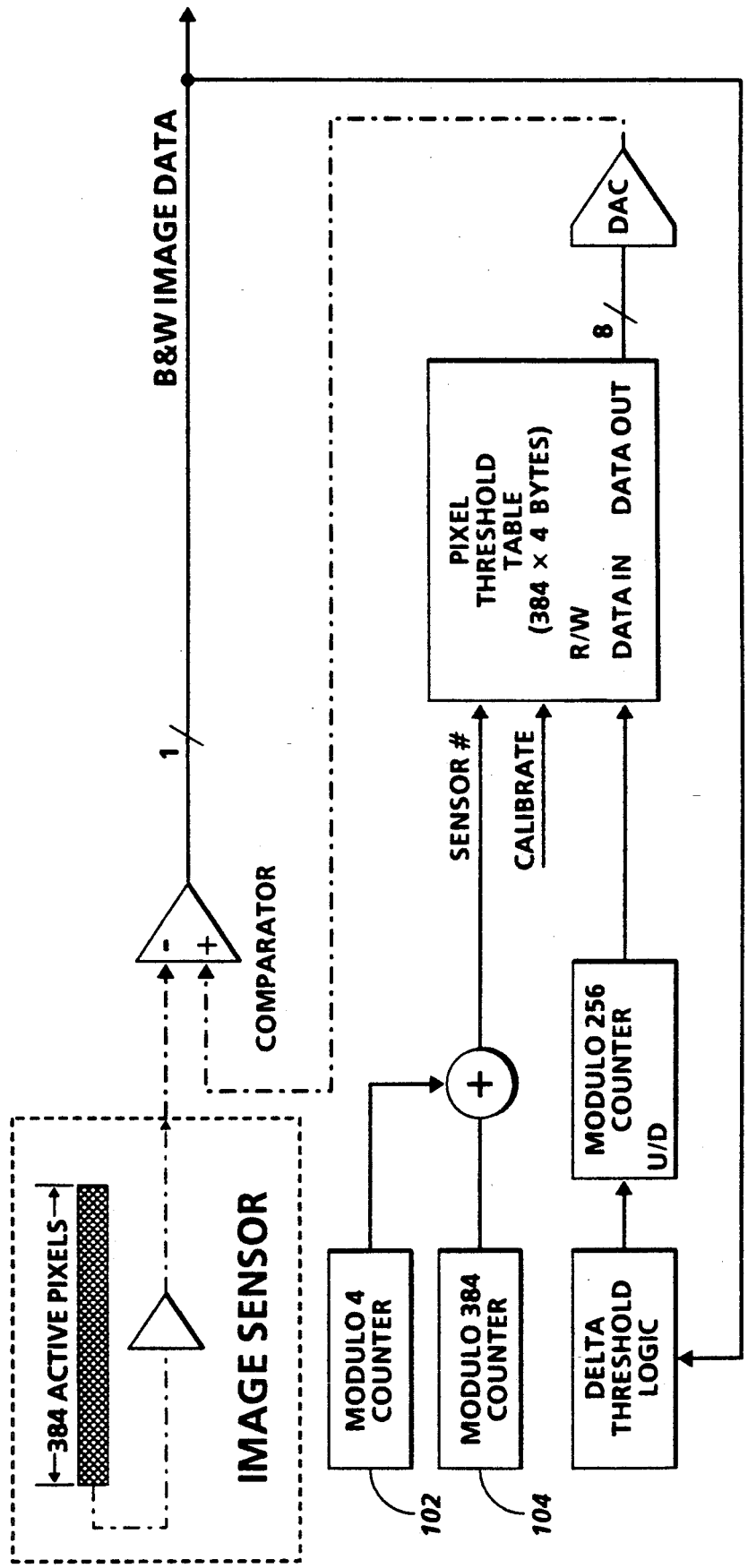

There is also a calibration signal 96 and a continually cycling density level illustrated by modular 256 counter 98. The modular 256 counter 98 represents density threshold levels provided by the delta threshold logic 100 to provide the appropriate output of the converter 90 to compare with the analog signal from the selected sensor on line 86. Upon comparison, the output of the comparator 84 is the reference signal that is stored in the threshold table representing that particular sensor FIG. 7, represents similar circuitry for threshold values for pictorial images and includes the modular 4 counter 102 and the modular 384 counter 104 to provide the sixteen threshold values for a complete half tone cell as previously described.

Figure 8:
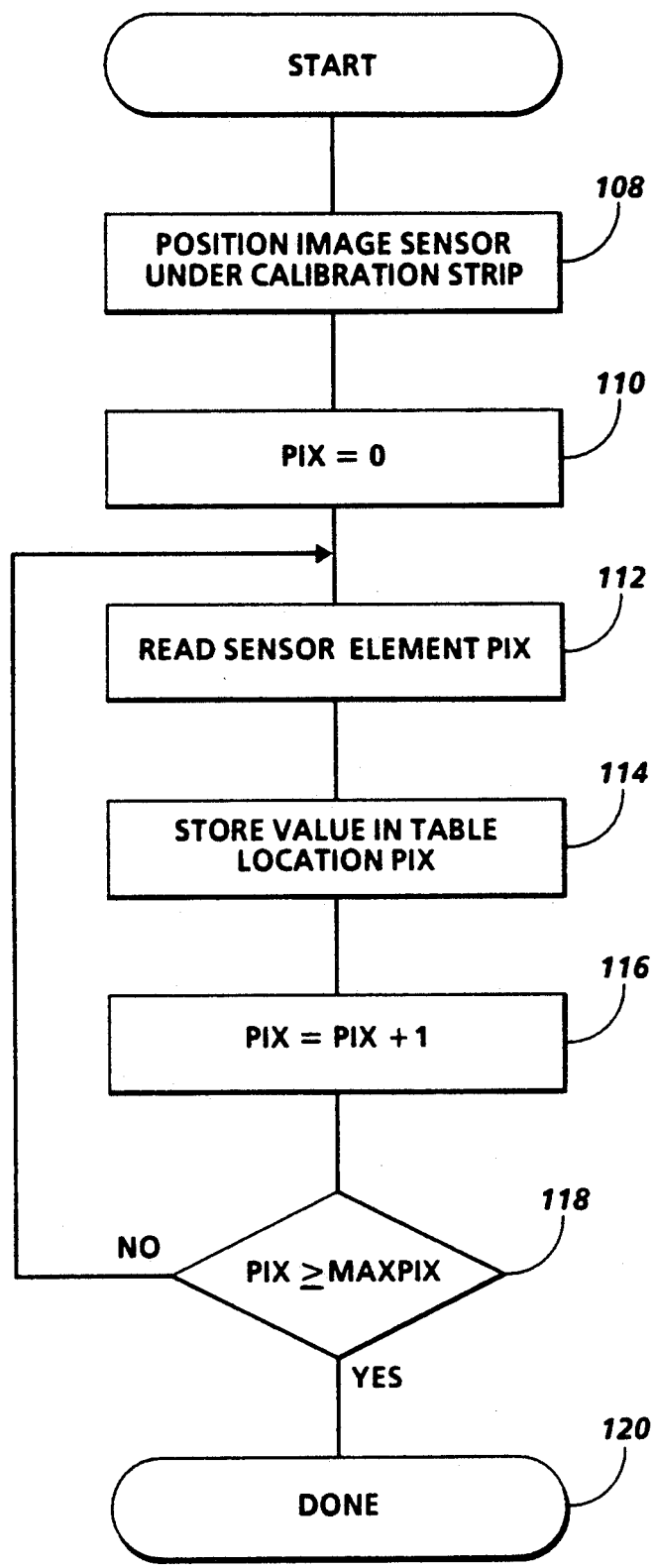
FIGS. 8 and 9 illustrate flow charts of the text and pictorial techniques in accordance with the present invention.

With reference to FIG. 8, there is illustrated a flow chart of the calibration procedure for text images. In particular, block 108, illustrates the positioning of the image sensor array under the calibration strip. The block 110 illustrates the particular pixel element that is being calibrated beginning with the first pixel or sensor element. The sensor is read as shown at 112 and the value of the sensor stored in the threshold table illustrated at 114. Block 116 illustrates shifting to the next sensor element and the decision is made at block 118 whether or not the last or maximum pixel number has been reached. If not, the system cycles back to read the next pixel element. If the pixel element or sensor being read is the final or maximum sensor, then the calibration is completed as shown at block 120.

Figure 9:
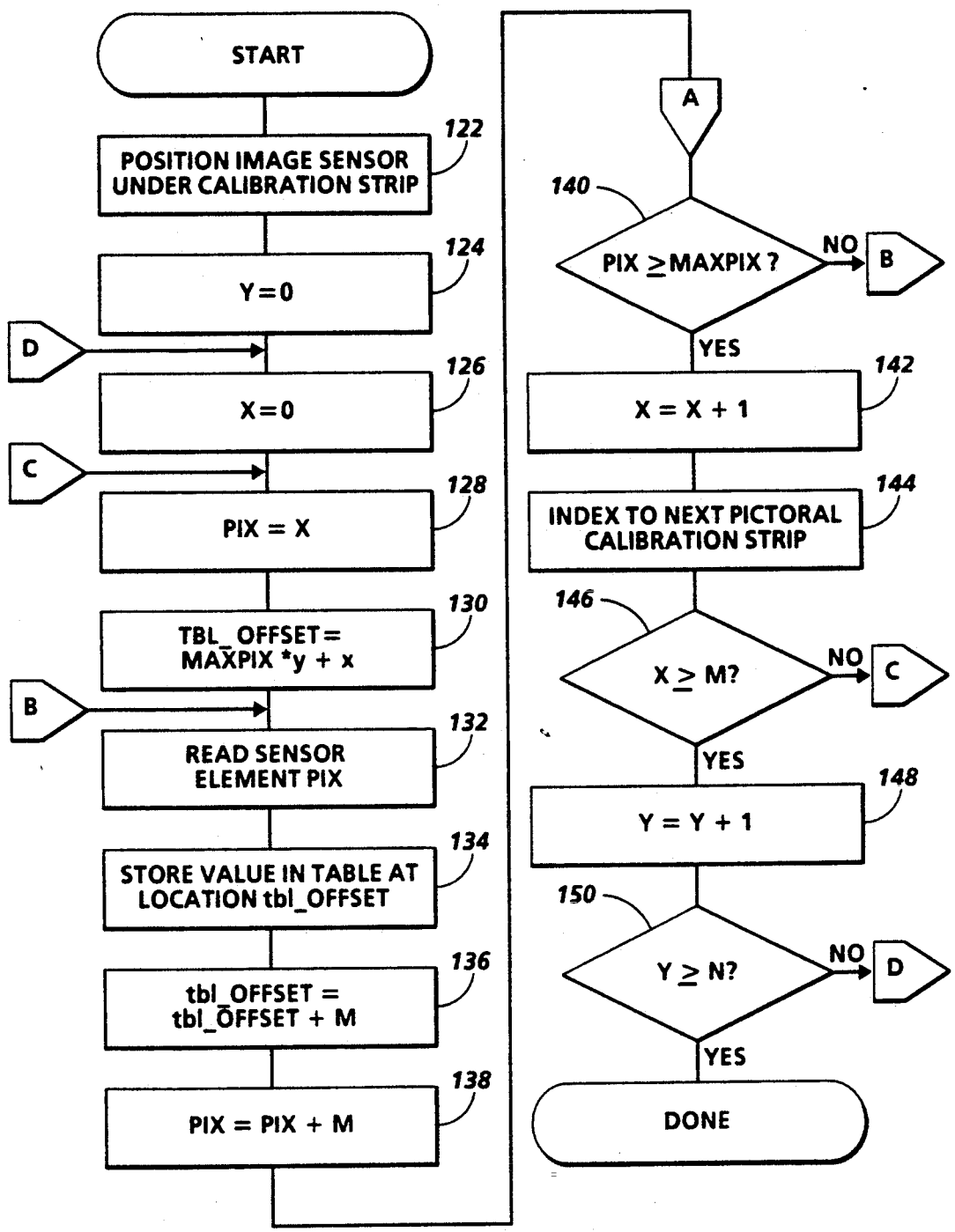

With reference to FIG. 9, there is illustrated a flow chart of the pictorial mode calibration wherein capital M is the X dimension of a half tone cell and N is the Y dimension of a half tone cell, X is the horizontal position within the half tone cell, and Y is the vertical position within the half tone cell. As with the text mode, block 122 represents the positioning of the sensor array under the pictorial calibration strip. Blocks 124 and 126 represent the initialization of the half tone cell at the position zero, and block 128 is the current sensor or pixel element being calibrated. Block 130 represents the pointer to the data and the look up table, and block 132 is essentially the reading of each sensor element to provide the appropriate calibration signal in the look up table as illustrated at 134. Block 136 illustrates the reading of a first sensor and the offsetting the dimension of the half tone cell to read the next sensor. In other words, as illustrated in FIG. 5, initially, sensor or pixel #1 is read then sensor 5 and then sensor 9 and so on as set forth in block 138. At block 140, the decision is made whether or not the pixel being read is the maximum pixel. If so, there is an index as illustrated in block 142 and 144 to the next pictorial calibration strip. If the pixel is not the maximum pixel, then as illustrated at B, the sequence loops to read the next sensor element shown at 132. If however the system indexes to the next pictorial calibration strip, a decision is made at 146 whether or not the horizontal position within the half tone cell has reached the dimension M of the half tone cell. If not, the system loops to block 128 to read that particular pixel. If yes, the vertical position of the half tone cell is indexed as shown at block 148 until the vertical position within the half tone cell reaches the Y dimension of the half tone cell as shown at decision block 150. If the vertical position has reached the maximum then the calibration sequence is completed. If not, as illustrated at D, the system loops back to block 126.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In a scanning system having a plurality of image reading elements, each reading element providing a signal response to a scanned object, and having a movable support carrying a plurality of test patches the method of scanning a document comprising the steps of:
   selecting a given test patch of said plurality of test patches to be scanned the given test patch being positioned in communication with the image reading elements,
   scanning the test patch and storing in a threshold table the signal response of each reading element to the test patch,
   providing a document to be scanned,
   scanning the document and comparing the signal response of each reading element with the corresponding stored test patch signal response, and
   printing a mark or not printing a mark in response to the comparison for each reading element.

2. In a scanning system having a plurality of image reading elements, the method of calibrating the scanning system using a calibration strip having a plurality of predetermined grey scale levels comprising the steps of:
   placing the calibration strip at given grey scale levels,
   initially scanning the calibration strip and storing the signal response of each reading element of the calibration strip at the given grey scale levels in a memory,
   providing a document to be scanned, and
   scanning the document and comparing the signal response of each reading element with the corresponding grey scale level signal response stored in memory.

3. The method of claim 2 wherein the calibration strip provides continuous grey scale levels.

4. The method of claim 2 wherein the calibration strip is mounted on a movable element and including the step of moving the movable element to provide desired grey scale levels.

5. In a scanning system having a calibration strip with a plurality of predetermined densities and having a plurality of image reading elements, the method of calibrating the scanning system for scanning pictorial images, the pictorial images including pixels represented by half tone cells comprising the steps of:

scanning the calibration strip at a first density level and storing the signal response of selected reading elements to the first density level in a memory, scanning the calibration strip at a second density level and storing the signal response of selected reading elements to the second density level in the memory, and continuing the scanning of the calibration strip for a third density level to store calibration signals for halftone cells in the memory for the pixels of the pictorial images.

6. The method of claim 5 wherein the image reading elements remain fixed and the density levels are moved relative to the reading elements.

7. In a scanning device having an LED array generating light rays and a plurality of image reading elements for scanning images, a calibration system comprising:

a contrast control, a calibration strip mounted on the contrast control, the contrast control including a plurality of density patches with predetermined densities, means to move the contrast control to locate a given density patch in communication with the LED array, means to reflect rays from the given density patch onto the mage reading elements, and means to record the response of the image reading elements in a threshold table for comparing with rays reflected from images whereby the calibration of the scanning device is adjustable.

8. The calibration system of claim 7 wherein the contrast control includes a slide and the calibration strip is mounted on the underside of the slide.

9. The calibration system of claim 8 wherein the density patches vary from a light density to a dark density for calibrating text images and including a knob secured to the slide for moving a given density patch directly opposite the LED array.

10. The calibration system of claim 7 wherein the density patches include a first plurality of patches for calibrating text images and a second plurality of patches for calibrating pictorial images.

11. In a scanning device having an LED array generating light rays and a plurality of image reading elements, the reading elements representing M by N halftone cells, a calibration system comprising:

a contrast control, a calibration strip mounted on the contrast control including a plurality of pictorial stripes, the density of each stripe corresponding to the density of one pixel in a half tone cell, means to move the contrast control to locate the pictorial stripes in communication with the LED array, means to reflect light rays from the given pictorial stripe onto the image reading elements, and means to record the response of the image reading elements in a threshold table to provide a half tone cell reference.

12. The calibration system of claim 11 wherein the calibration strip includes density patches from a light density to a dark density for calibrating text images.

13. A method for calibrating sensing elements of a sensor array for scanning images in a pictorial mode, wherein M is the first dimension and N is the second dimension of a half tone cell representing a portion of the image, comprising the steps of:

positioning the sensing elements of the sensor array under a pictorial calibration strip, initializing the half tone cells at a position zero, reading of a first sensing element and off setting in the M dimension of the half tone cell to read the next sensing element, storing the appropriate sensed calibration signal in a look up threshold table, indexing in the M dimension to read all the sensing elements of a half tone cell in the M direction, and indexing and off setting in the N dimension to read all the sensing elements of a half tone cell in the N direction.

14. In a scanning device having an LED array generating light rays and a plurality of image reading elements for scanning images, a calibration system comprising:

a contrast control, calibration means mounted on the contrast control, the contrast control including a plurality of patches with predetermined densities including text image reference patches and pictorial image reference patches, means to move the contrast control to locate a given density patch in communication with the LED array, means to reflect rays from the given density patch onto the mage reading elements, and means to record the response of the image reading elements in a threshold table for comparing with rays reflected from images whereby the calibration of the scanning device is adjustable for both text and pictorial images.

* * * * *